(12) United States Patent
Akagi et al.

(10) Patent No.: US 7,680,329 B2
(45) Date of Patent: Mar. 16, 2010

(54) CHARACTER RECOGNITION APPARATUS AND CHARACTER RECOGNITION METHOD

(75) Inventors: Takuma Akagi, Kawasaki (JP); Toshio Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 896 days.

(21) Appl. No.: 11/497,330

(22) Filed: Aug. 2, 2006

(65) Prior Publication Data
US 2007/0041643 A1    Feb. 22, 2007

(30) Foreign Application Priority Data
Aug. 22, 2005    (JP)    ............................. 2005-239916

(51) Int. Cl.
*G06K 9/34*    (2006.01)
(52) U.S. Cl. .................. 382/178; 382/179; 382/229
(58) Field of Classification Search ................ 382/178, 382/179, 181, 229
See application file for complete search history.

(56) References Cited

U.S. PATENT DOCUMENTS

| | | | |
|---|---|---|---|
| 4,024,500 A | | 5/1977 | Herbst et al. |
| 5,491,758 A | * | 2/1996 | Bellegarda et al. ........... 382/187 |
| 5,768,414 A | * | 6/1998 | Jamali ........................ 382/173 |
| 5,889,887 A | * | 3/1999 | Yabuki et al. ................ 382/178 |
| 5,896,464 A | * | 4/1999 | Horiuchi et al. ............. 382/178 |

FOREIGN PATENT DOCUMENTS

| | | |
|---|---|---|
| JP | 2000-113101 | 4/2000 |
| JP | 2002-063548 | 2/2002 |
| KR | 10-1990-0008378 | 11/1990 |
| KR | 10-1993-0014166 | 7/1993 |

OTHER PUBLICATIONS

Korean Notice of Allowance dated Mar. 6, 2008 for Appln. No. 10-2006-78850.

* cited by examiner

*Primary Examiner*—Jon Chang
(74) *Attorney, Agent, or Firm*—Pillsbury Winthrop Shaw Pittman, LLP

(57) ABSTRACT

A character recognition apparatus generates each character candidate from a character string written in a plurality of character entry boxes written on a sheet of paper such as a business form, and performs character recognition. A row image separating unit acquires an image containing a plurality of character entry boxes and the character string. A character extraction processing unit detects each point at which a plurality of lines are in contact with each other and intersect in the character string contained in the image, determines a point at which the character string should be cut or recombined on the basis of the placement relationship between the point and the corresponding character entry box, and generates each character candidate constituting the character string. A character recognition unit performs character recognition for each character candidate generated by the character extraction processing unit.

12 Claims, 14 Drawing Sheets

CHARACTER RECOGNITION APPARATUS AND CHARACTER RECOGNITION METHOD

CROSS-REFERENCE TO RELATED APPLICATIONS

This application is based upon and claims the benefit of priority from prior Japanese Patent Application No. 2005-239916, filed Aug. 22, 2005, the entire contents of which are incorporated herein by reference.

BACKGROUND OF THE INVENTION

1. Field of the Invention

The present invention relates to a character recognition apparatus and character recognition method which perform character recognition for a character string written in a plurality of character entry boxes written on a sheet of paper such as a business form.

2. Description of the Related Art

As an example of a sheet of paper as a character recognition target for a character recognition apparatus, a business form on which a plurality of character entry boxes are written in advance is presented. Each character written on such a business form does not necessarily fall within a corresponding character entry box. Part of the character written in a given character entry box may protrude from the character entry box, and the protruding portion may be in contact with part of another character in an adjacent character entry box. In such a case, if character extraction processing is performed for the character in each character entry box and character recognition processing is performed in the character recognition apparatus, a correct character recognition result often cannot be obtained.

If "00" is contained in a written character string, a ligature (e.g., a horizontal line written over 0 and 0 when they are consecutively written) protruding from a character entry box is often contained in the character string. A technique of detecting such a ligature from a positional relationship with a character entry box and separating it from the box has begun to be used. However, if characters are in contact with each other in a complicated manner, such a technique cannot work well. In addition, if a character entry box changes in shape or size, a method or algorithm for determining a cutting place must be greatly rewritten in accordance with the change.

There are various techniques for character extraction processing for a character string written in a plurality of character entry boxes. For example, Jpn. Pat. Appln. KOKAI Publication No. 2000-113101 (FIG. 1 and the like) discloses a technique of obtaining the longitudinal and transverse projections of a character string, comparing them with thresholds to determine whether there is a continuous line between characters, and performing character extraction processing in accordance with the determination result.

The above reference shows the technique for detecting a correction line. If, therefore, characters are in contact with each other in a complicated manner, this technique cannot perform accurate character extraction.

Under the circumstances, it is desired to provide a technique which realizes accurate character extraction for a character string written in a plurality of character entry boxes written on a sheet of paper.

BRIEF SUMMARY OF THE INVENTION

According to one aspect of the present invention, there is provided a character recognition apparatus for generating each character candidate from a character string written in a plurality of character entry boxes written on a sheet of paper and performing character recognition, the apparatus comprising: an image acquiring unit which acquires an image containing the plurality of character entry boxes and the character string; a character extraction processing unit which detects each point at which a plurality of lines are in contact with each other or intersect in the character string contained in the image, determines a point at which the character string is to be cut or recombined on the basis of a placement relationship between the each point and a corresponding character entry box, and generates each character candidate constituting the character string by performing the cutting or recombination; and a character recognition unit which performs character recognition for each character candidate generated by the character extraction processing unit.

According to another aspect of the present invention, there is provided a character recognition method of generating each character candidate from a character string written in a plurality of character entry boxes written on a sheet of paper and performing character recognition, the method comprising: acquiring an image containing the plurality of character entry boxes and the character string; performing character extraction processing of detecting each point at which a plurality of lines are in contact with each other or intersect in the character string contained in the image, determining a point at which the character string is to be cut or recombined on the basis of a placement relationship between the each point and a corresponding character entry box, and generating each character candidate constituting the character string by performing the cutting or recombination; and performing character recognition for each character candidate generated in the character extraction processing.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
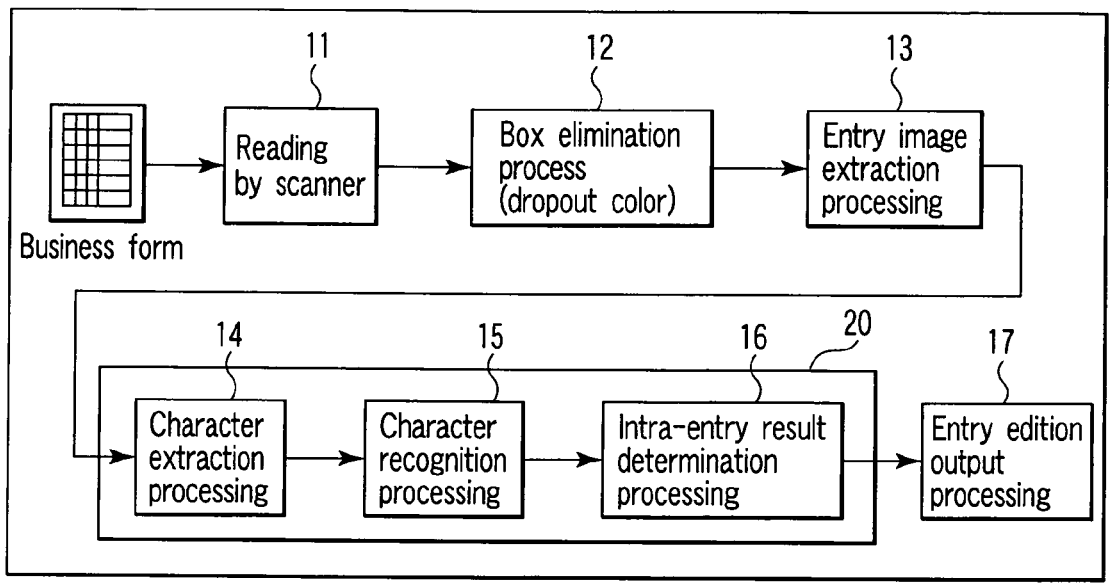
FIG. 1 is a block diagram showing the basic flow of processing applied to a character recognition apparatus according to an embodiment of the present invention.

FIG. 1 is a block diagram showing the basic flow of processing applied to a character recognition apparatus according to an embodiment of the present invention.

A plurality of character entry boxes are written on a business form, and a character is written in each character entry box. First, reading processing 11 for information on the business form is performed by a scanner to acquire image data. Box elimination processing 12 is then performed to eliminate the information of each character entry box from the image data acquired by the scanner. As a result, the information of the character string is left. If a character entry box is formed by a dropout color, the information of the character entry box is eliminated by using color information prepared in advance. As a result, only the information of the character string is left as black pixel information.

Extraction processing 13 for each image corresponding to each entry on the business form is performed for the information obtained upon elimination of the character entry boxes. The processing 13 is performed by using the information of the position of each entry registered in advance.

Subsequently, processing 20 including character extraction processing 14, character recognition processing 15, and intra-entry result determination processing 16 is executed for each image corresponding to each entry on the business form. That is, the character extraction processing 14 for each character is performed by using the information of the position of each character entry box registered in advance for each entry. The character recognition processing 15 for each extracted character is performed. The intra-entry result determination processing 16 for determining the contents of the character string in the entry is performed on the basis of the character recognition result.

Finally, entry edition output processing 17 is performed to edit the contents of the character string in each entry and output the edited contents to a file or paper.

Figure 2A:
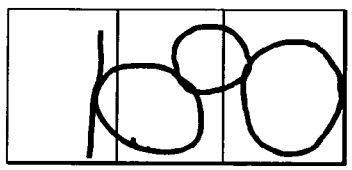
FIGS. 2A and 2B are views for explaining an extraction technique on the assumption that an image in one character entry box is regarded as a one-character image on the basis of the position of the character entry box.
Figure 2B:
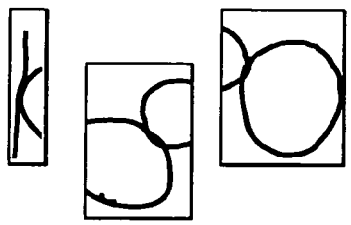

In general character extraction processing, an image in one character entry box is extracted on the basis of the position of the character entry box on the assumption that the image is a one-character image. FIGS. 2A and 2B show an example of character image extraction in this case. FIG. 2A shows an example in which the three-digit character string "180" is written in three consecutive character entry boxes. As is obvious, parts of the character "8" protrude from the corresponding character entry box into the adjacent character entry boxes. In character extraction, since the character images in the respective character entry boxes are extracted, the character images are extracted such that portions of the character "8" enter the character images on the two sides. For this reason, even if character recognition processing is performed for each of these character images, a correct character recognition result cannot be obtained.

Under the circumstances, it is desired to propose a technique which can accurately cut characters even if the characters are in contact with each other in a complicated manner, and can eliminate the need to greatly change a character cutting algorithm.

Figure 3:
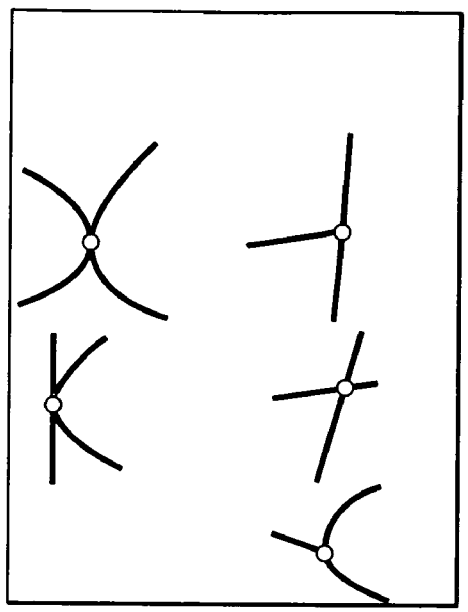
FIG. 3 is a view for explaining a type of character contact in freely handwritten characters.

Upon analyzing the contacts between characters written on business forms each having a plurality of character entry boxes, the present inventor found that most of the contacts are very similar to the contacts between freely handwritten characters. Free handwriting is handwriting in the form of freely writing a character string on a sheet of paper having no entry box like writing of an address on postal matter or in the form of writing a character string in an entry box without any partition lines or character entry boxes. The contacts between freely handwritten characters are roughly classified into "contact" and "intersection", which are shown in, for example, FIG. 3. Such character contacts are common to numerals, alphabetic characters, kana characters, and kanji characters excluding alphabetic characters in a calligraphic style.

Figure 4A:
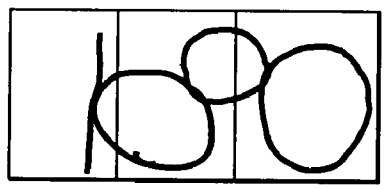
FIGS. 4A and 4B are views for explaining a technique of applying, to a character string written in character entry boxes, character contact position determination processing and character position extraction processing which are applied to a freely handwritten character string.
Figure 4B:
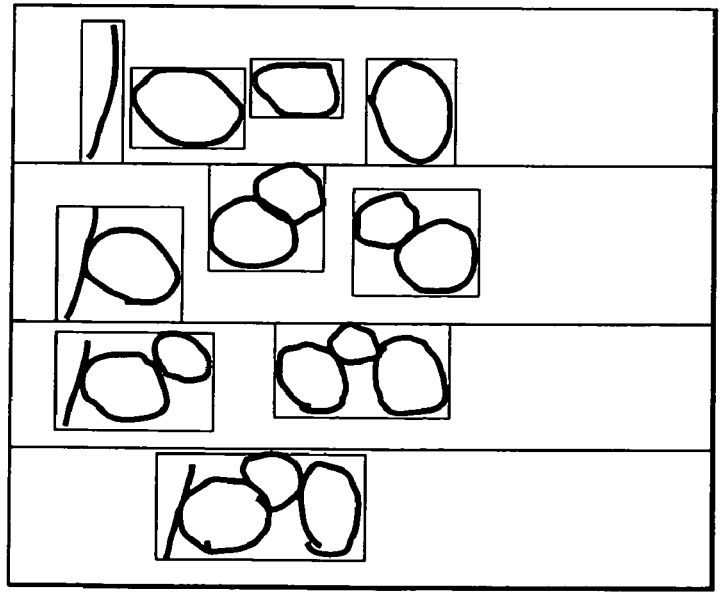

As described above, since the contacts between characters written in a plurality of character entry boxes are very similar to the contacts between freely handwritten characters, character contact position determination processing and character position extraction processing which are applied to freely handwritten character strings may also be applied to character strings written in character entry boxes. FIGS. 4A and 4B show an example in this case.

FIG. 4A shows an example in which the three-digit character string "180" is written in three consecutive character entry boxes as in the case shown in FIG. 2A. Portions of the character "8" protrude from the corresponding character entry box into the adjacent character entry boxes. In this case, the character contact positions between "1" and "8" and between "8" and "0" can be detected by using character position extraction processing and the like applied to freely handwritten character strings without using any position information of the character entry boxes. The character strings can therefore be separated from each other at these positions. If, however, such a technique is simply used, even portions which should not correspond to character contacts are detected as character contacts, and hence wrong character candidates are generated, resulting in an increase in the number of unnecessary character candidates. Character parts "1", "o", "o", "0" are generated from the character string shown in FIG. 4, and character candidates are generated by combining the character parts. This generates a total of 10 character candidates, as shown in FIG. 4B. As a result, the load of character recognition processing as one of the most time-consuming processes in business form recognition increases. This further increases the time required for character recognition processing. In addition, a recognition error tends to occur. If, for example, character recognition is performed for the generated character candidates, "o" and "o" generated by separating "8" may be erroneously recognized as "0" and "0".

This embodiment therefore proposes a technique of performing accurate character extraction without causing the above problems. The details of this character extraction technique will be described later.

Figure 5:
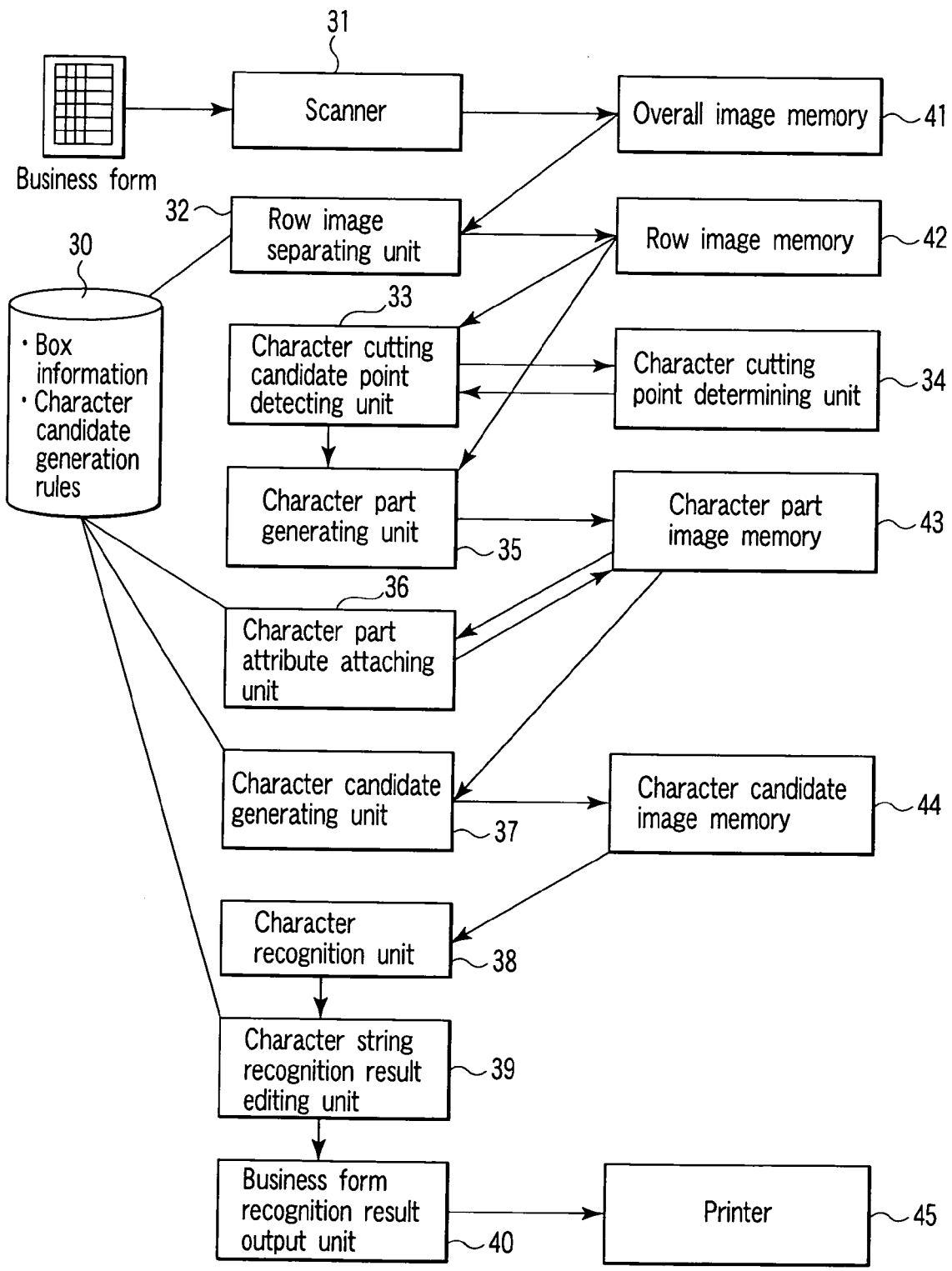
FIG. 5 is a block diagram showing the functional arrangement of the character recognition apparatus according to this embodiment.

FIG. 5 is a block diagram showing the functional arrangement of the character recognition apparatus according to this embodiment.

The character recognition apparatus according to this embodiment is configured to perform character recognition by generating each character candidate from the character string written in a plurality of character entry boxes written on a business form, and comprises an information database 30, scanner 31, row image separating unit (image acquiring means) 32, character cutting candidate point detecting unit (detecting means) 33, character cutting point determining unit (determining means) 34, character part generating unit (generating means) 35, character part attribute attaching unit (attribute attaching means) 36, character candidate generating unit (character candidate generating means) 37, character recognition unit (character recognition means) 38, character string recognition result editing unit 39, business form recognition result output unit 40, overall image memory 41, row image memory 42, character part image memory 43, character candidate image memory 44, and printer 45.

Note that the above processing units 33 to 37 constitute a character extraction processing unit (character extraction processing means) which implements character extraction processing.

The information database 30 stores box information indicating the placement position (including ruled line information and coordinate information) of each character entry box and character candidate generation rules as rules for generating each character candidate from each character part.

The scanner 31 reads information including character entry boxes and a character string from an input business form, and generates an overall image. The overall image generated by the scanner 31 is stored in the overall image memory 41.

The row image separating unit 32 acquires a row image corresponding to a row position in each entry on the business form by separating it from the overall image stored in the overall image memory 41. Each row image acquired by the row image separating unit 32 is stored in the row image memory 42.

The character cutting candidate point detecting unit 33 detects a point at which a plurality of lines is in contact with each other or intersect in the character string contained in each row image stored in the row image memory 42. The point detected by this operation is regarded as a cutting candidate point. All the cutting candidate points detected in this case are not necessarily used as cutting points.

On the basis of the placement relationship between the point detected by the character cutting candidate point detecting unit 33 and a character entry box nearest to the point, the character cutting point determining unit 34 determines whether a character string is to be cut at the point. That is, cutting candidates at which cutting should be actually performed are narrowed down from the respective cutting candidate points obtained by the character cutting candidate point detecting unit 33.

The character cutting point determining unit 34 may have the following function. If, for example, the distance between the point detected by the character cutting candidate point detecting unit 33 and the vertical line of the character entry box nearest to the point is equal to or more than a predetermined value, the character cutting point determining unit 34 determines that cutting is not to be performed at the position of the point. If the distance is less than the predetermined value, the character cutting point determining unit 34 determines that cutting is to be performed at the position of the point.

The character cutting point determining unit 34 may also have a function of determining that cutting at the position detected by the character cutting candidate point detecting unit 33 is to be performed, if, for example, 1) the central coordinates of a character part to be generated when cutting is performed at the position of the point detected by the character cutting candidate point detecting unit 33 fall within a predetermined range in the corresponding character entry box, 2) the size of the character part is equal to or more than a predetermined value, and 3) the distance between the central coordinates of the character part and the vertical line of the character entry box which is located nearest to the position of the central coordinates is equal to or more than a predetermined value.

The character part generating unit 35 cuts a character string at the position of a cutting candidate point obtained from the character cutting candidate point detecting unit 33, and generates each character part constituting the character string. Each character part image extracted by the character part generating unit 35 is stored in the character part image memory 43.

The character part attribute attaching unit 36 attaches, to each character part stored in the character part image memory 43, attribute information such as box attributes (e.g., a box number) for identifying a character entry box to which each character part stored in the character part image memory 43 belongs. The character entry box to which the character part belongs is determined on the basis of the box information (including box type information and placement position information) stored in the information database 30. The character part to which the attributes are attached by the character part attribute attaching unit 36 is stored in the character part image memory 43.

The character candidate generating unit 37 generates each character candidate from each character part stored in the character part image memory 43 in accordance with the character candidate generation rules stored in the information database 30. In generating character candidates, the box information stored in the information database 30 is also referred to as needed. Each character candidate image generated by the character candidate generating unit 37 is stored in the character candidate image memory 44.

The character candidate generating unit 37 has a function of, if there are a plurality of character parts to which the same box attributes are attached, generating a new character part as one character candidate by recombining the plurality of character parts. The character candidate generating unit 37 also has a function of, if there is a character part to which no box attributes can be attached by the character part attribute attaching unit 36 (for example, there is a character part to which an attribute indicating that it is not known that the part belongs to which box), generating a new character part as one character candidate by recombining the character part with an adjacent character part, a function of, if there is a character part to which no box attributes can be attached by the character part attribute attaching unit 36 and the longitudinal size of the character part is less than a predetermined value, discarding the character part upon regarding it as a ligature or the like, and the like.

The character recognition unit 38 performs character recognition for each character candidate image stored in the character candidate image memory 44.

The character string recognition result editing unit 39 edits the character recognition result on each entry which is obtained through the character recognition unit 38 to generate a character candidate result associated with one business form.

The business form recognition result output unit 40 outputs the character candidate result generated by the character string recognition result editing unit 39 through an output device such as the printer 45.

The details of the character extraction technique according to this embodiment will be described below.

<First Character Extraction Technique>

The first character extraction technique will be described with reference to FIGS. 6A to 6C and 7. Note that FIG. 5 will also be referred to as needed.

Figure 6A:
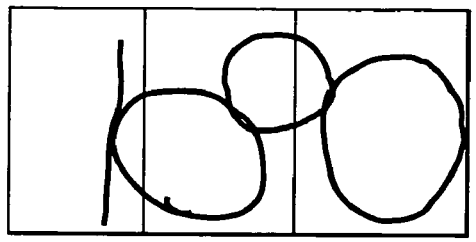
FIGS. 6A, 6B, and 6C are views for explaining the first character extraction technique.

Assume that, as shown in FIG. 6A, the image formed by writing the three-digit character string "180" in the three consecutive character entry boxes is stored in the row image memory 42. Part of the character "8" of this character string protrudes from the corresponding character entry box to the left and are in contact with the character "1". In addition, another part of the character "8" protrudes from the corresponding character entry box to the right and are in contact with the character "0".

Figure 6B:
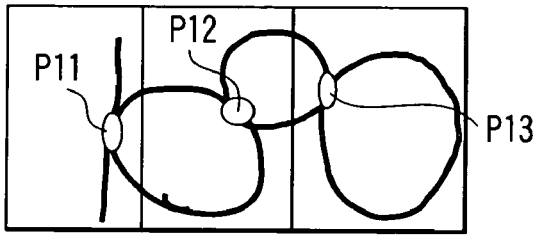

The character cutting candidate point detecting unit 33 detects points (cutting candidate points) at which a plurality of lines of this character string is in contact with each other or intersect. With this operation, three cutting candidate points P11, P12, and P13 are obtained, as shown in FIG. 6B.

The character cutting point determining unit 34 then verifies the position of each cutting candidate point. More specifically, the character cutting point determining unit 34 obtains the distance between each of the three cutting candidate points P11, P12, and P13 detected by the character cutting candidate point detecting unit 33 and the vertical line of a corresponding character entry box nearest to the cutting candidate point. If the distance is equal to or more than a predetermined value, the character cutting point determining unit 34 determines that cutting is not to be performed at the position of the cutting candidate point. If the distance is less than the predetermined value, the character cutting point determining unit 34 determines that cutting is to be performed at the position of the cutting candidate point.

That is, with regard to the cutting candidate point P11, the distance between the point and the vertical line of the character entry box on the right side of the point is obtained. With regard to the cutting candidate point P12, the distance between the point and the vertical line of the character entry box on the right side of the point is obtained. With regard to the cutting candidate point P13, the distance between the point and the vertical line of the character entry box on the left side of the point is obtained.

Of the three cutting candidate points, with regard to the cutting candidate point P12, since the distance between the point and the position of the vertical line of the nearest character entry box is equal to or more than the predetermined value, the cutting candidate point P12 is excluded from the three cutting candidate points. As a result, only the cutting candidate points P11 and P13 are left as points at which cutting should be performed.

Figure 6C:
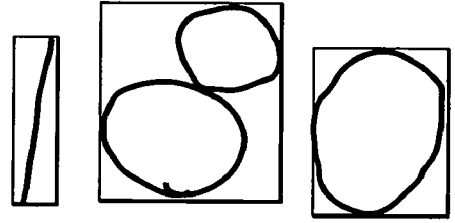

With this operation, since the character part generating unit 35 cuts the character string at the positions of the cutting candidate points P11 and P13, three character parts are obtained, as shown in FIG. 6C. Since the character candidate generating unit 37 sets the above three character parts as character candidates, the character recognition unit 38 obtains the characters "1", "8", and "0" as character recognition results.

Note that in verifying the position of each cutting candidate point, the shift width from the center of a character entry box or the like may be used instead of the distance from the vertical line of the character entry box.

Figure 7:
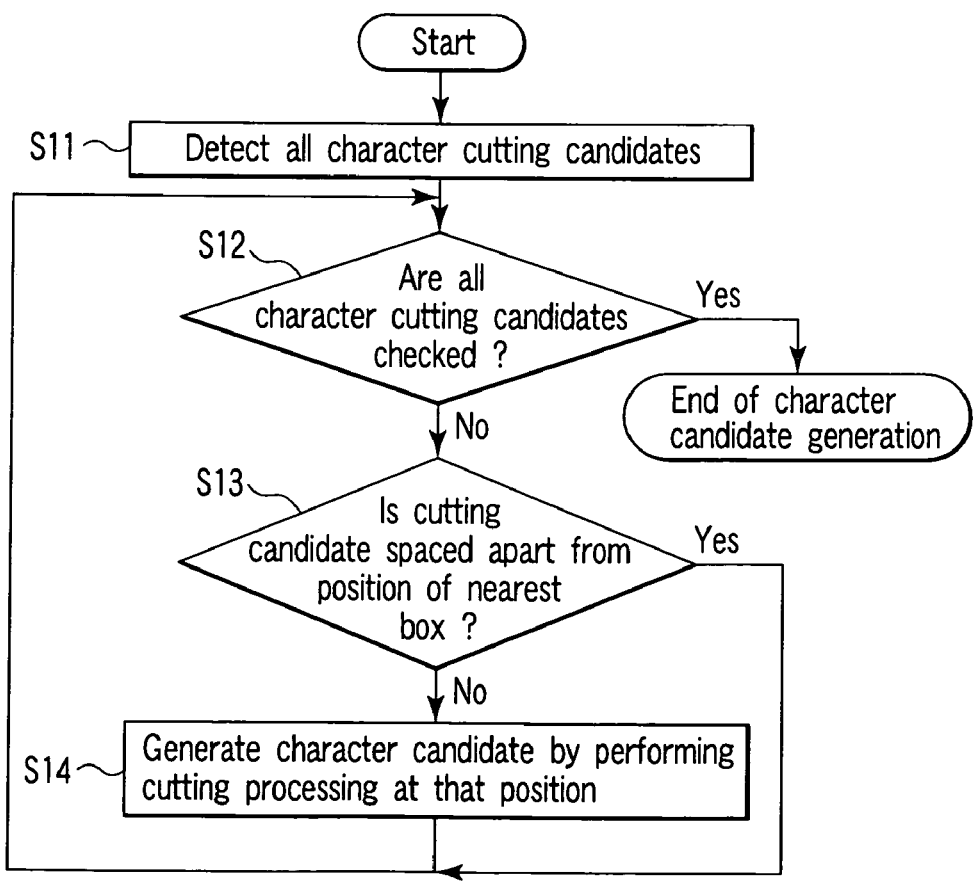
FIG. 7 is a flowchart showing an example of the operation based on the first character extraction technique.

An example of the operation based on the first character extraction technique will be described next with reference to FIG. 7.

All cutting candidate points (points at which a plurality of lines is in contact with each other or intersect) contained in the character string written in a plurality of character entry boxes are detected (step S11), and the detected cutting candidate points are sequentially verified (step S12).

It is determined whether the distance between a target cutting candidate point and the vertical line of a character entry box nearest to the cutting candidate point is equal to or more than a predetermined value (step S13). If the distance is equal to or more than the predetermined value, cutting at the position of the cutting candidate position is not performed. If the distance is less than the predetermined value, cutting at the position of the cutting candidate point is performed to generate character candidates from the generated character parts (step S14).

When all character candidates are generated in this manner, character recognition for each character candidate is performed.

<Second Character Extraction Technique>

The second character extraction technique will be described with reference to FIGS. 8A to 8C and 9. Note that FIG. 5 will also be referred to as needed.

Figure 8A:
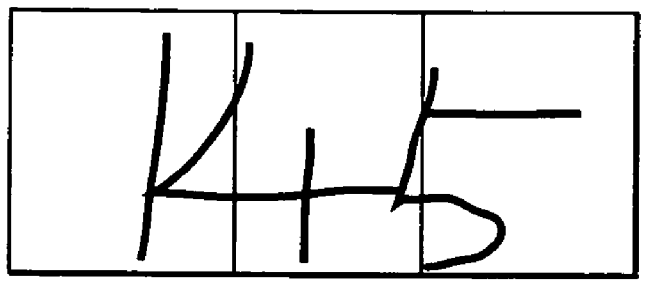
FIGS. 8A, 8B, and 8C are views for explaining the second character extraction technique.

Assume that, as shown in FIG. 8A, the image formed by writing the three-digit character string "145" in the three consecutive character entry boxes is stored in the row image memory 42. Part of the character "4" of this character string protrudes from the corresponding character entry box to the left and is in contact with the character "1". In addition, part of the character "5" protrudes from the corresponding character entry box to the left and is in contact with the character "4".

Figure 8B:
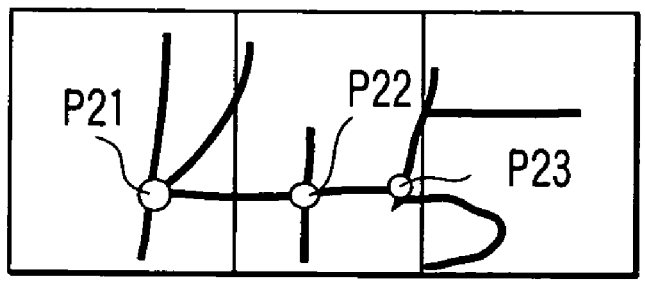

The character cutting candidate point detecting unit 33 detects points (cutting candidate points) at which a plurality of lines of this character string are in contact with each other or intersect. With this operation, three cutting candidate points P21, P22, and P23 are obtained, as shown in FIG. 8B.

The character cutting point determining unit 34 then verifies the positions or sizes of the character parts generated when cutting is performed at the positions of the respective cutting candidate points. More specifically, on the basis of the central coordinates or longitudinal sizes of the respective character parts generated when cutting is sequentially performed at the positions of the cutting candidate points P21, P22, and P23, the character cutting point determining unit 34 determines whether to perform cutting at the position of each cutting candidate point.

Figure 8C:
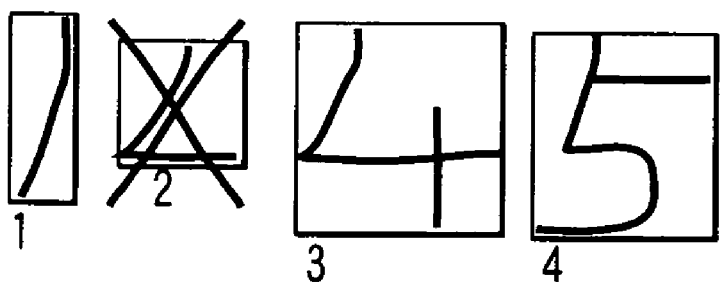

If cutting is performed at the position of the cutting candidate point P21, character part 1 shown in FIG. 8C is generated. The following verification result is obtained for character part 1.

The central coordinates of character part 1 are located near the center of the character entry box (within a predetermined rectangular range).

The longitudinal size of character part 1 is not small relative to the size of the character entry box (equal to or more than a predetermined value).

The central coordinates of character part 1 are spaced apart from the position of the vertical line of the nearest character entry box (equal to or more than a predetermined value).

As a consequence, the character cutting point determining unit 34 regards that character part 1 can be a character candidate, and determines that cutting should be performed at the position of the cutting candidate point P21. The character part generating unit 35 generates character part 1 by actually performing this cutting, and the character candidate generating unit 37 sets character part 1 as a character candidate.

If cutting is performed at the position of the cutting candidate point P22, character part 2 shown in FIG. 8C is generated. The following verification result is obtained for character part 2.

The central coordinates of character part 2 are not located near the center of the box but are located between the first character entry box and the second character entry box (do not fall within a predetermined rectangular range).

The longitudinal size of character part 2 is small relative to the size the box (less than a predetermined value).

The central coordinates of character part 2 are located near the position of the vertical line of the nearest character entry box (within a predetermined distance).

As a result, the character cutting point determining unit 34 regards that character part 2 cannot be a character candidate, and determines that cutting should not be performed at the position of the cutting candidate point P22. Therefore, character part 2 does not become a character candidate by itself.

If cutting is performed at the position of the cutting candidate point P23, character part 3 shown in FIG. 8C is generated. The same verification result as that obtained for character part 1 is obtained for character part 3.

As a result, the character cutting point determining unit 34 regards that character part 3 can be a character candidate, and determines that cutting should be performed at the position of the cutting candidate point P23. The character part generating unit 35 generates character part 3 by actually performing this cutting, and the character candidate generating unit 37 sets character part 3 as a character candidate.

When character part 4 is verified in the same manner, the same verification result for character parts 1 and 3 is obtained, and character part 4 becomes a character candidate.

With this operation, the character candidate generating unit 37 generates three character parts 1, 3, and 4 as character candidates, as shown in FIG. 8C, and hence the character recognition unit 38 obtains the characters "1", "4", and "5" as character recognition results.

Figure 9:
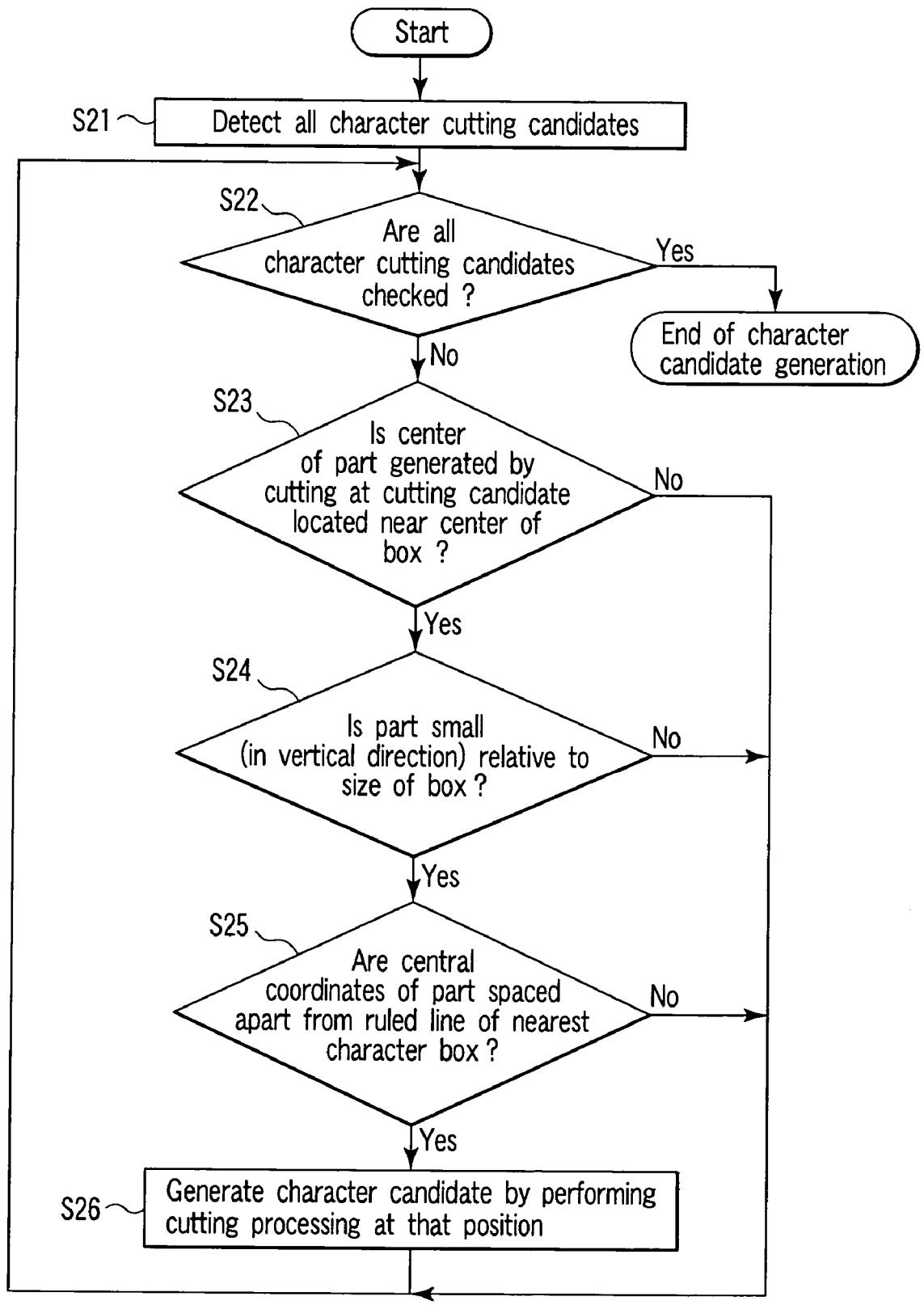
FIG. 9 is a flowchart showing an example of the operation based on the second character extraction technique.
Figure 10A:
FIGS. 10A, 10B, 10C, 10D, and 10E are views showing various shapes of character entry boxes.
Figure 10B:
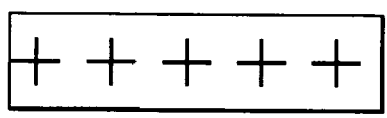
Figure 10C:
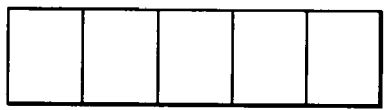
Figure 10D:
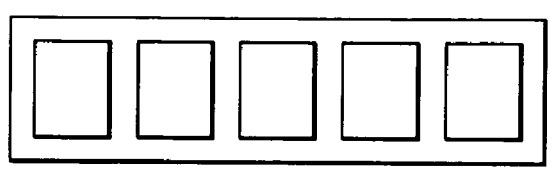
Figure 10E:
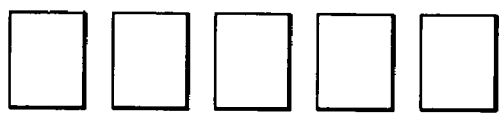

An example of the operation based on the second character extraction technique will be described next with reference to FIG. 9.

All cutting candidate points (points at which a plurality of lines are in contact with each other or intersect) contained in the character string written in a plurality of character entry boxes are detected (step S21). Character parts to be generated when cutting is performed at the positions of the respective detected cutting candidate points are sequentially verified (step S22).

That is, it is determined whether 1) the central coordinates of a character part to be generated when cutting is performed at the position of a target cutting candidate point are located near the center of a character entry box (within a predetermined rectangular range), 2) whether the longitudinal size of the character part is small relative to the size of the character entry box (equal to or more than a predetermined value), and 3) whether the central coordinates of the character part are spaced apart from the position of the vertical line of the nearest character entry box (by a predetermined distance or more) (steps S23 to S25).

If the above three conditions are not met, cutting is not performed at the position of the corresponding cutting candidate point. If the above three conditions are met, cutting is performed at the position of the corresponding cutting candidate point to generate a character candidate from the generated character part (step S26).

When all character candidates are generated in this manner, character recognition is performed for each character candidate.

<Third Character Extraction Technique>

The third character extraction technique will be described with reference to FIGS. 10A to 13. Note that FIG. 5 will also be referred to as needed.

The above character extraction processing (specifically, the processing of determining points at which cutting should be performed and the processing of generating character candidates) depends on the type of character entry box. Character entry boxes include various shapes like those shown in FIGS. 10A to 10E. If a character entry box changes in shape, the processing of determining points at which cutting should be performed and the processing of generating character candidates must be changed. Processing for such changes generally demands many development steps. If, therefore, such changes are made every time a character entry box changes in shape, the development cost increases. The following character extraction technique solves this problem.

Figure 11A:
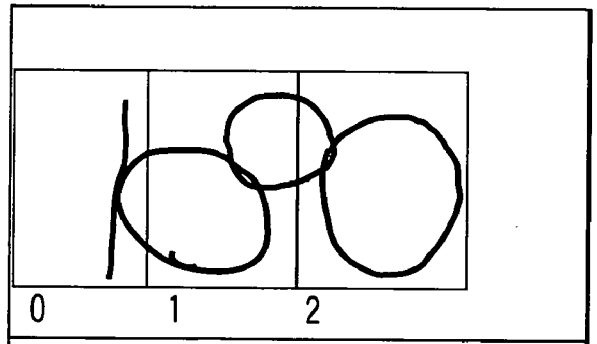
FIGS. 11A, 11B, and 11C are views for explaining the third character extraction technique.

Assume that, as shown in FIG. 11A, the image formed by writing the three-digit character string "180" in the three consecutive character entry boxes is stored in the row image memory 42. Part of the character "8" of this character string protrudes from the corresponding character entry box to the left and is in contact with the character "1". In addition, another part of the character "8" protrudes from the corresponding character entry box to the right and is in contact with the character "0". Assume that box numbers for identification are attached to the three character entry boxes. Assume that in this case, "0", "1", and "2" are sequentially attached as box numbers to the three character entry boxes from the left.

As in the second technique described above, the character cutting candidate point detecting unit 33 detects points (cutting candidate points) at which a plurality of lines of this character string are in contact with each other or intersect. With this operation, three cutting candidate points are obtained. Note that in this case, narrowing down of cutting candidate points by the character cutting point determining unit 34 is not performed.

The character part generating unit 35 then cuts the character string at each cutting candidate point detected by the character cutting candidate point detecting unit 33 to generate each character part constituting the character string. That is, the four character parts "1", "o", "o", and "0" are generated as shown in FIG. 11B by flexible cutting without consideration of the position of each character entry box.

The character part attribute attaching unit 36 attaches corresponding attributes to the four generated character parts "1", "o", "o", and "0".

The following are examples of attributes attached to each part:
- information indicating the relative relationship between the position of the part and the position of the corresponding character entry box,
- information indicating to which character entry box the part belongs,
- information indicating that it is not known that to which character entry box the part belongs,
- information indicating the size of the part, information indicating the shape of the part,
- information indicating whether the part is generated by cutting at the position of a cutting candidate point,
- information indicating the position of a specific cutting candidate point at which cutting is performed to generate the part, and
- information obtained by selectively combining the above pieces of information.

Figure 11B:
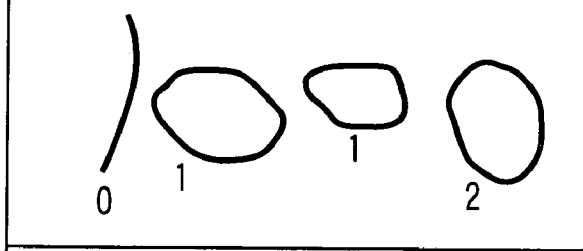
Figure 11C:
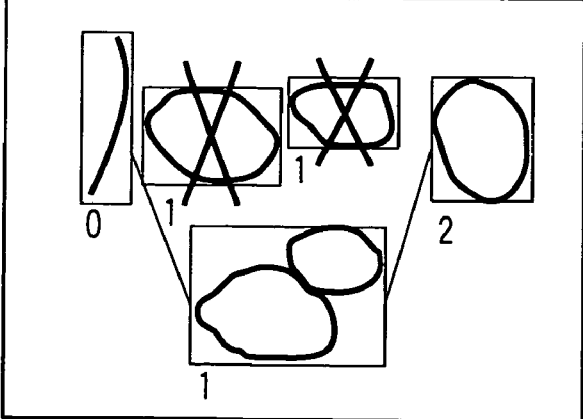

In the example shown in FIG. 11B, the box numbers "0", "1", "1", and "2" are attached as attributes to the character entry boxes to which the respective character parts belong (to which box attributes are attached). That is, since the central coordinates of a part of the character "1" fall within the character entry box with the box number "0", the box number "0" is attached as an attribute. Since the central coordinates of the two parts "o" and "o" formed by separating the character "8" fall within the character entry box with the box number "1", the box number "1" is attached as an attribute. Since the central coordinates of a part of the character "0" fall within the character entry box with the box number "2", the box number "2" is attached as an attribute.

Note that character candidate generation rules as criteria for determining whether parts are to be combined to generate character candidates and combined parts are to be used as character candidates are stored in the information database 30 in advance. This makes it possible for the character candidate generating unit 37 to generate each character candidate according to the character candidate generation rules.

For example, the character candidate generation rule that "parts having the same box number are combined, and parts before combining are excluded from character candidates" is prepared, and each character candidate is generated in accordance with the rule.

With this operation, since the character candidate generating unit 37 generates three character parts as character candidates as shown in FIG. 1C, the character recognition unit 38 obtains the characters "1", "8", and "0" as character recognition results.

As compared with the technique shown in FIGS. 4A and 4B, the number of character candidates can be greatly reduced from 10 to three by only providing simple attributes obtained from box information and generation rules, and the generation of ambiguous character candidates like those shown in FIGS. 4A and 4B (candidates that may make recognition results become "1000") can be prevented.

The following are examples of attributes and character candidate generation rules.
- Any part with a small size is not left as a character candidate unless it is combined with another character candidate.
- A new part formed by combining parts with the same box attributes is provided with the same box attributes as those of the parts combined.
- Any part which is not known to belong to a specific part is not left as a character candidate unless it is combined with a part having box attributes.
- Any part which is not known to belong to a specific part and has a size less than a predetermined size is either combined with both left and right parts to generate a character candidate or is not combined with neither of them and eliminated.

Figure 12:
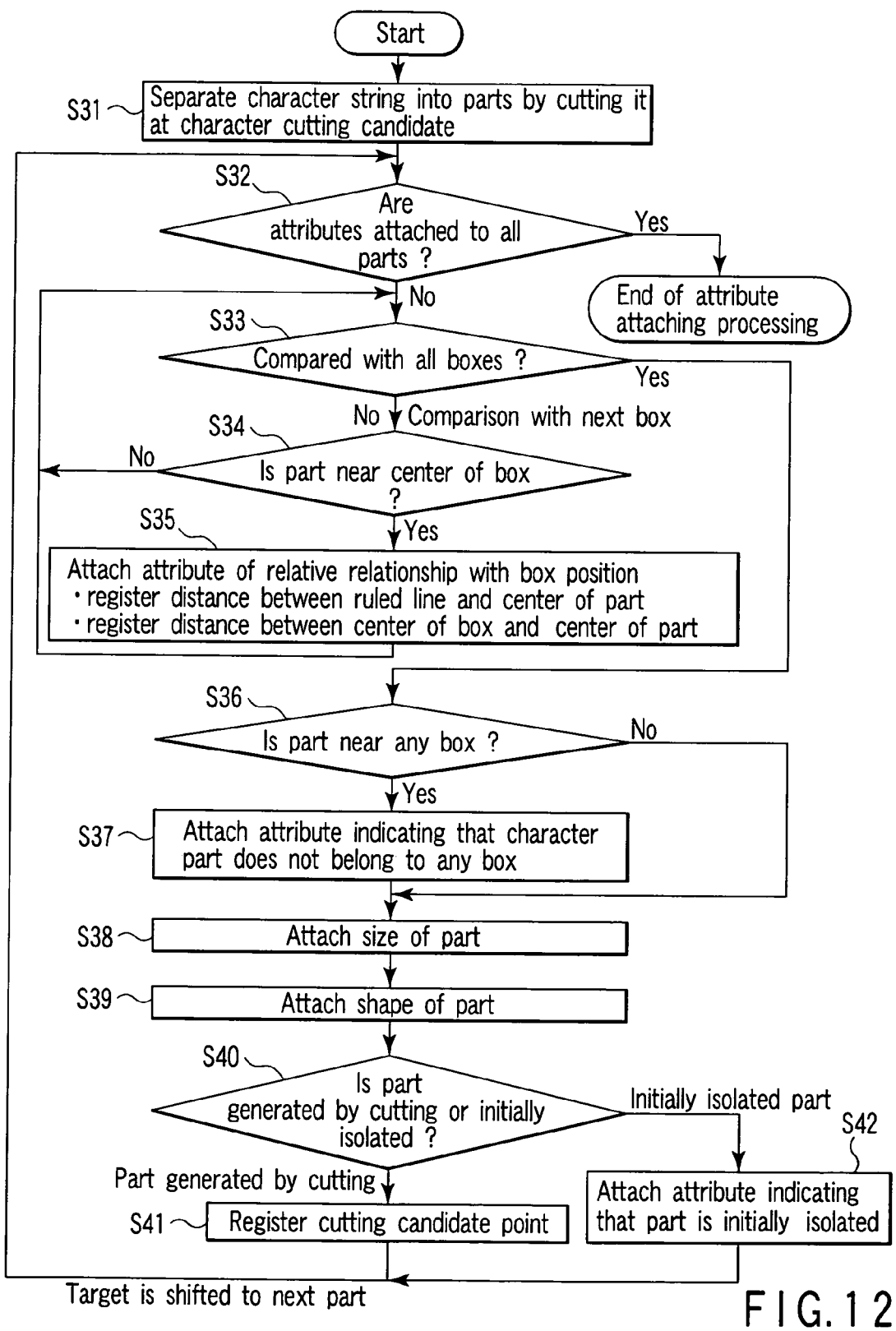
FIG. 12 is a flowchart showing an example of the operation in attribute attaching processing based on the third character extraction technique.
Figure 13:
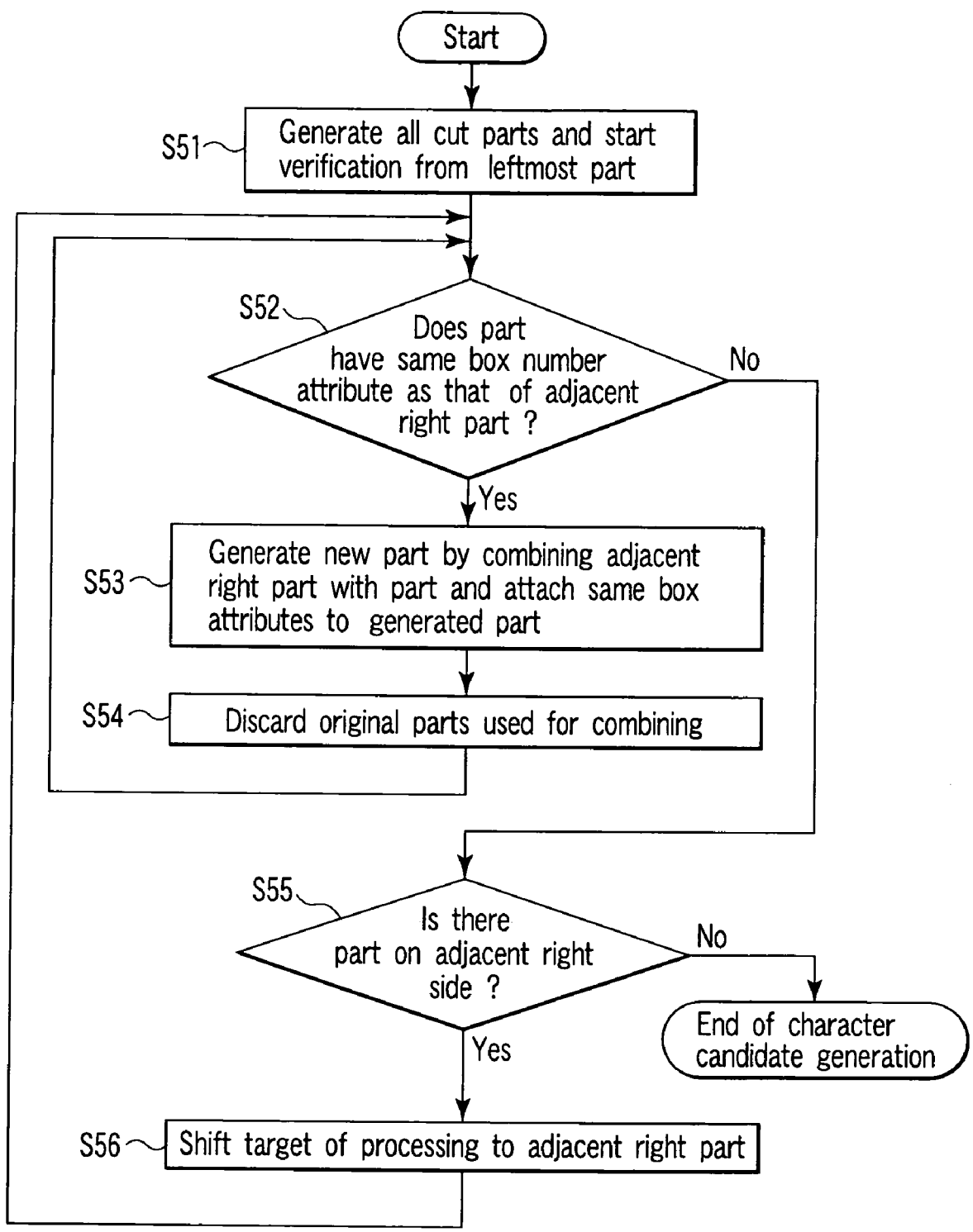
FIG. 13 is a flowchart showing an example of the operation in character candidate generation processing based on the third character extraction technique.

An example of the operation based on the third character extraction technique will be described next with reference to FIGS. 12 and 13. This operation will be described separately as to attribute attaching processing of attaching attributes to each character part and character candidate generation processing of generating character candidates after the attribute attaching processing.

An example of the operation in the attribute attaching processing will be described first with reference to FIG. 12.

All character candidate points (points at which a plurality of lines are in contact with each other or intersect) contained in the character string written in a plurality of character entry boxes are detected, and cutting is performed at the positions of all the character candidate points to generate a plurality of character parts (step S31).

When the plurality of character parts are generated, processing for sequentially attaching attributes to the respective character parts is performed (step S32).

The position of a target character part is compared with the position of each character entry box (step S33) to detect a character entry box having a central position whose distance from the target character part is less than a predetermined value (i.e., a character entry box near the target character part) (step S34). Attributes indicating the relative relationship between the position of the character part and the position of the character entry box (including a box number for identifying the character entry box) are attached to the target character part, and information about the distance between the vertical ruled line of the character entry box and the center of the target character part, the distance between the center of the character entry box and the center of the target character part, and the like is registered (step S35).

If no character entry box near the target character part is detected, an attribute indicating that the character part does not belong to any box is attached to the target character part (steps S36 and S37).

In addition, the information of the size and shape of the target character part is attached as attributes (steps S38 and S39). If the target character part is a character part generated by cutting, a cutting candidate point is registered. If the target character part is an initially isolated character part, an attribute indicating the corresponding information is attached the character part (steps S41 to S43).

When attributes are attached to all character parts in this manner, character candidate generation processing is performed.

An example of the operation in the character candidate generation processing will be described next with reference to FIG. 13.

After all character parts are generated by cutting and attributes are attached to them, verification is sequentially performed from the leftmost character part to determine whether to combine with a right adjacent character part (step S51).

That is, it is determined whether the right adjacent character part and the target part have the same box number as an attribute. If they have the same box number, the right adjacent character part and the target part are combined to generate a new character part, and the original character parts used for the combining operation are discarded (steps S52 to S54). If they do not have the same box number, no combining processing is performed. If a character part is present on the adjacent right side, the target of processing is shifted to the character part on the adjacent right side, and verification is repeated (steps S55 and S56).

Each character part reconstructed in this manner is set as a character candidate, and the generation of all character candidates is complete. When the generation of all character candidates is complete, character recognition is performed for each character candidate.

An example of the application of the above third character extraction technique to a character string containing ligatures will be described next with reference to FIGS. 14A to 18.

Figure 14A:
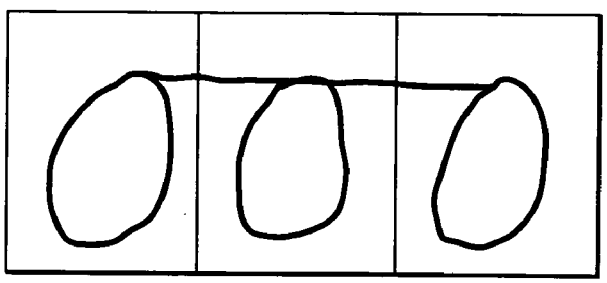
FIGS. 14A, 14B, and 14C are views showing an example of the application of the third character extraction technique to a character string containing ligatures.

Assume that, as shown in FIG. 14A, the image formed by writing the three-digit character string "000" in the three consecutive character entry boxes is stored in the row image memory 42. In this character string, the adjacent characters "0s" are combined with each other through the ligature "-".

Figure 14B:
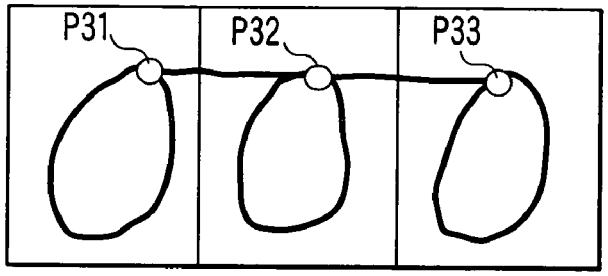

The character cutting candidate point detecting unit 33 detects points (cutting candidate points) at which a plurality of lines of this character string are in contact with each other or intersect. With this operation, three cutting candidate points P31, P32, and P33 are obtained, as shown in FIG. 14B.

Figure 14C:
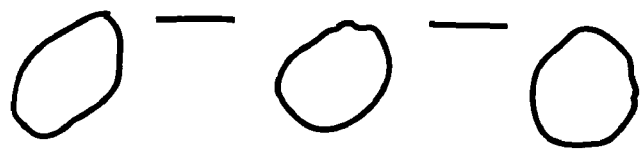

The character part generating unit 35 cuts the character string at the positions of the respective cutting candidate points detected by the character cutting candidate point detecting unit 33 to generate character parts constituting the character string. That is, as shown in FIG. 14C, the five character parts "0", "-", "0", "-", and "0" containing two ligatures are generated.

The character part attribute attaching unit 36 then attaches corresponding attributes to the five generated character parts "0", "-", "0", "-", and "0". Assume that in this case, "information indicating that it is not known that the character part belongs to which character entry box" is attached as an attribute to the character part "-" corresponding to a ligature.

The character candidate generating unit 37 then generates each character candidate in accordance with the character candidate generation rules.

The following are examples of the character candidate generation rules used in this case:

Parts belonging to the same box are combined.

Any part which is not known to belong to a specific box is combined with a part having box attributes.

Any part which is not known to belong to a specific box cannot be a character candidate by itself.

Figure 15:
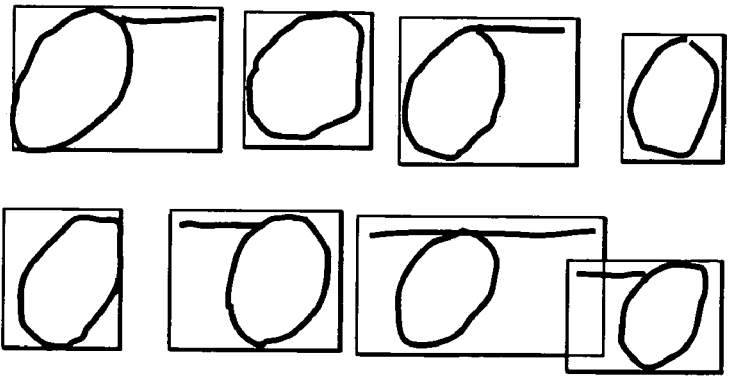
FIG. 15 is a view showing an example of an image obtained when the first character candidate generation rule is applied to a character string containing ligatures.

When such character candidate generation rules are used, the character candidate generating unit 37 generates character candidates containing character parts formed by combining the character part "-" corresponding to a ligature with each adjacent character part "0", as shown in FIG. 15. Since the character recognition unit 38 recognizes "0" with a ligature as normal "0", the characters "0", "0", and "0" are obtained as character recognition results.

If "0" with a ligature may be mistaken in character recognition, for example, the following character candidate generation rules are set:

Any part which is not known to belong to a specific box and is small in size in the height direction (less than a predetermined value) is not combined.

Any part which is not known to belong to a specific box cannot be a character candidate by itself.

Figure 16:
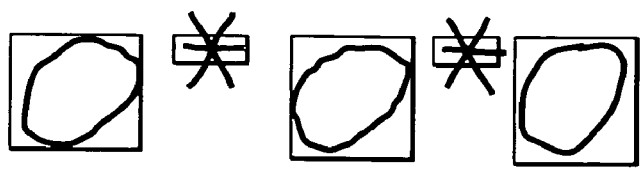
FIG. 16 is a view showing an example of an image obtained when the second character candidate generation rule is applied to the character string containing ligatures.

If such character candidate generation rules are used, the character candidate generating unit 37 discards the character part "-" corresponding to a ligature, and leaves only the three character parts "0", "0", and "0", as shown in FIG. 16. Therefore, the character recognition unit 38 obtains the characters "0", "0", and "0" as character recognition results.

Figure 17:
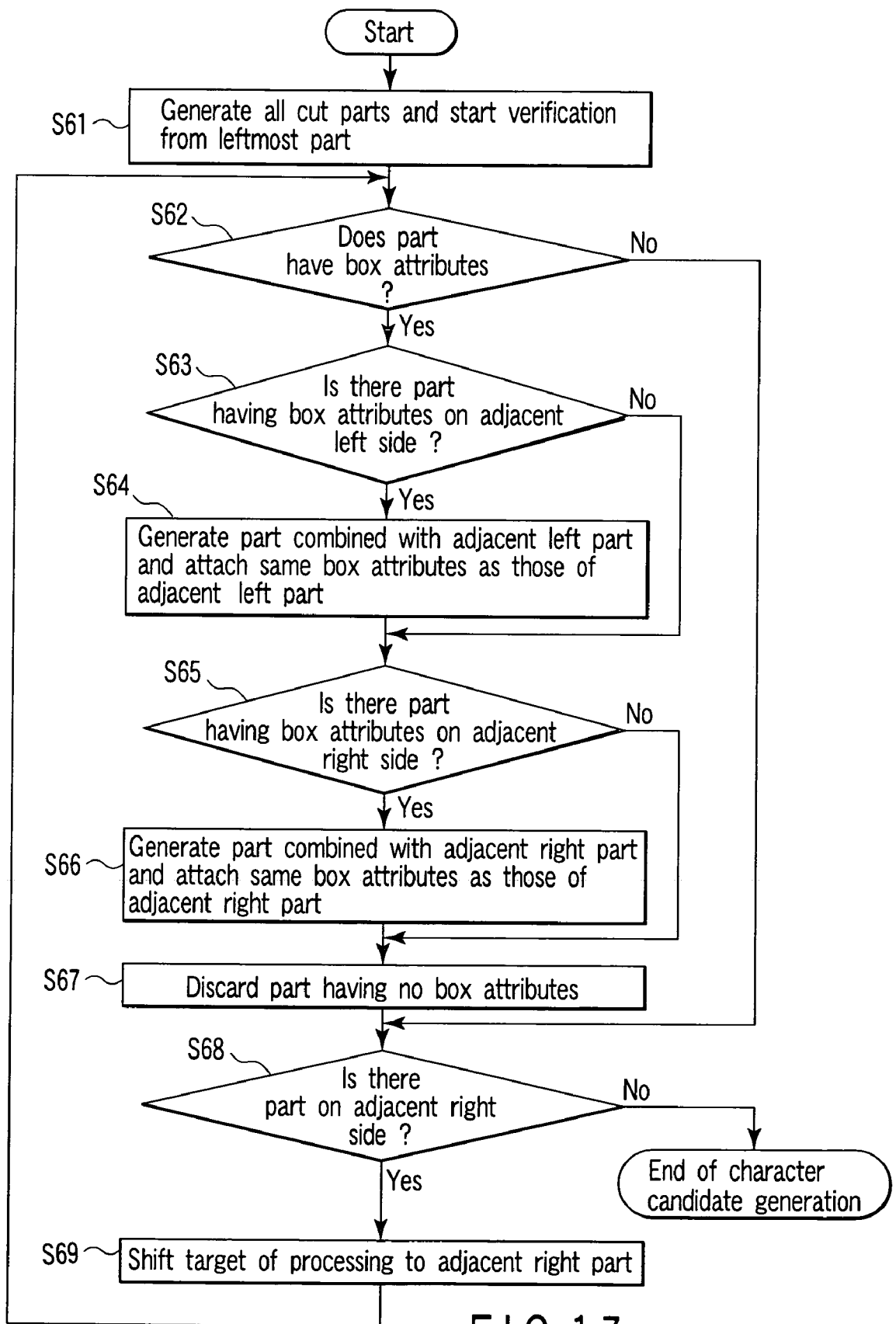
FIG. 17 is a flowchart showing an example of the operation when rules corresponding to FIG. 15 are applied to a character string containing ligatures.

An example of the operation in the application of the rules corresponding to FIG. 15 to a character string containing ligatures will be described next with respect to FIG. 17.

After all character parts are generated by cutting and attaching of attributes is complete, verification is sequentially performed from the leftmost character part to determine whether to combine with an adjacent character part (step S61).

A character part having no box attributes is set as a verification target (step S62). If there is a character part having box attributes on the adjacent left side, a character part is generated by combining the character part and the target part, and the same box attributes as those of the adjacent left character part are attached to the generated character part (steps S63 and S64). If there is a character part having box attributes on the adjacent right side, a character part is generated by combining the character part and the target part, and the same box attributes as those of the adjacent right character part are attached to the generated character part (steps S65 and S66). The part having no box attributes is discarded (step S67).

Subsequently, if there is a character part on the adjacent right side of the target character part, the target of processing is shifted to the adjacent right character part, and verification is repeated (steps S68 and S69).

Each character part reconstructed in this manner is set as a character candidate, and the generation of all character candidates is complete. When the generation of all character candidates is complete, character recognition is performed for each character candidate.

Figure 18:
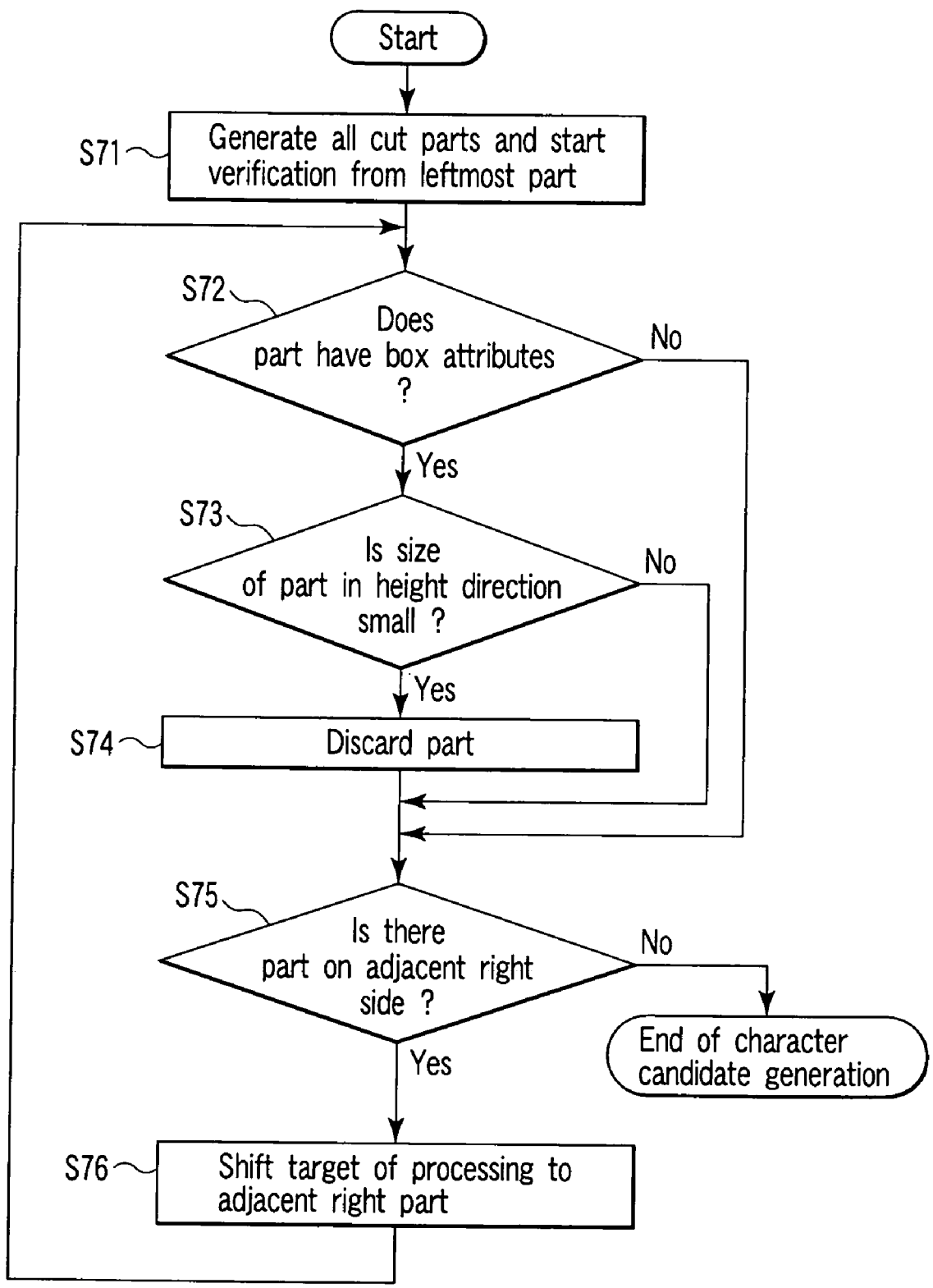
FIG. 18 is a flowchart showing an example of the operation when rules corresponding to FIG. 16 are applied to a character string containing ligatures.

An example of the operation in the application of the rules corresponding to FIG. 16 to a character string containing ligatures will be described next with respect to FIG. 18.

After all character parts are generated by cutting and attaching of attributes is complete, verification is sequentially performed from the leftmost character part to determine whether to combine with an adjacent character part (step S71).

A character part having no box attributes is set as a verification target (step S72). If the length of the target character part in the height direction is less than a predetermined value, the character part is discarded (steps S73 and S74).

Subsequently, if there is a character part on the adjacent right side of the target character part, the target of processing is shifted to the adjacent right character part, and verification is repeated (steps S75 and S76).

Each character part reconstructed in this manner is set as a character candidate, and the generation of all character candidates is complete. When the generation of all character candidates is complete, character recognition is performed for each character candidate.

A change in the type of character entry box can be easily handled by changing the character candidate generation rules. If, for example, adjacent character entry boxes are close to each other or characters are delimited by one box line, the characters may contact each other at a high possibility, and a character may protrude into an adjacent box at a high possibility. In such a case, the use of the following character candidate generation rules makes it easy to properly generate even a character between boxes:

Parts belonging to the same box are combined.

Any part which is not known to belong to a specific box is combined with a part having box attributes.

A part generated by combining parts belonging to the same box is given the same box attribute.

Even parts which have different box attributes are combined with each other if they are adjacent to each other, and two box attributes are attached.

If parts to be combined have three or more box attributes, they are not combined.

Figure 19:
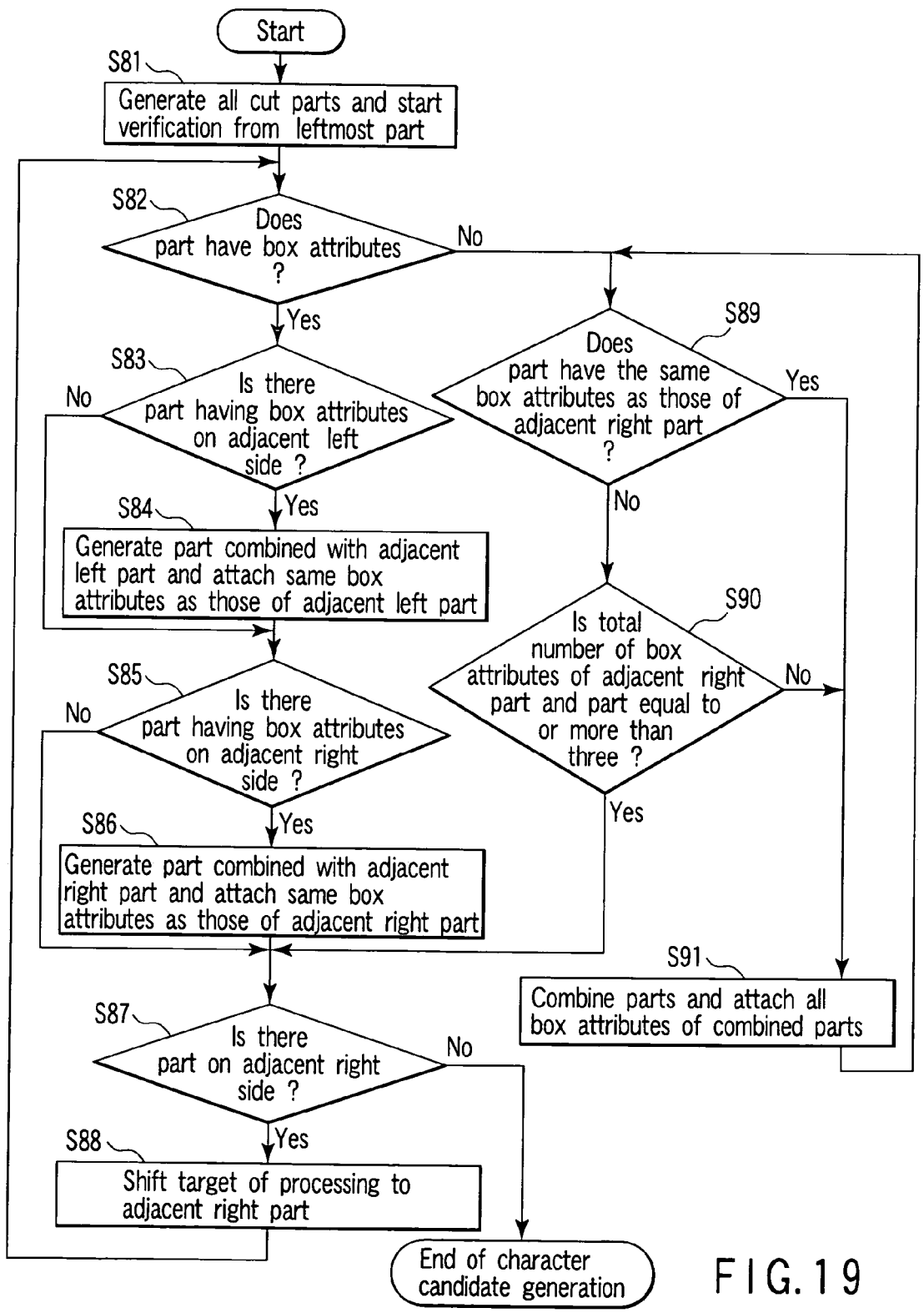
FIG. 19 is a flowchart showing an example of the operation in the use of other character candidate generation rules.

An example of the operation in the use of such character candidate generation rules will be described next with reference to FIG. 19.

After all character parts are generated by cutting and attributes are attached to them, verification is sequentially performed from the leftmost character part to determine whether to combine with a right adjacent character part (step S81).

First, it is determined whether a target character part is a character part having no box attributes (step S82). If the target character part is a character part having no box attributes, the following processing is performed. If a character part having box attributes is present on the adjacent left side, a character part is generated by combining the character part with the target part, and the same box attributes as those of the adjacent left character part are attached to the generated character part (steps S83 and S84). If a character part having box attributes is present on the adjacent right side, a character part is generated by combining the character part with the target part, and the same box attributes as those of the adjacent right character part are attached to the generated character part (steps S85 and S86).

If the target character part is a character part having box attributes, it is determined whether the character part has the same box attributes as those of the adjacent right character part (step S89). If they have the same box attributes, the character parts are combined, and all the box attributes of the combined character parts are attached (step S91). If they do not have the same box attributes, and the total number of the box attributes of the adjacent right character part and the box attributes of the character part is three or more, the character parts are combined, and all the box attributes of the combined character parts are attached (step S91). This processing is repeated until the total number of the box attributes of the adjacent right character part and the box attributes of the character part become three or more.

If there is a character part on the adjacent right side of the target character part, the target of processing is shifted to the adjacent right character part, and verification is repeated (steps S87 and S88).

Each character part reconstructed in this manner is set as a character candidate, and the generation of all character candidates is complete. When the generation of all character candidates is complete, character recognition is performed for each character candidate.

Characters do not easily contact each other depending on the shapes of character entry boxes. If, for example, character entry boxes are arranged at predetermined intervals, characters do not easily contact each other. In such a case, the use of the following character candidate generation rules makes it possible to reduce the number of unnecessary character candidates generated. Therefore, reading mistakes can be reduced, and the processing time can be shortened.

Parts belonging to the same box are combined.

Any part which is not known to belong to a specific box is combined with a part having box attributes.

Any part which is not known to belong to a specific box is not set as a character candidate by itself.

Parts having different box attributes are not combined.

Any part which is not known to belong to a specific box and is small in size is eliminated without being combined.

Figure 20:
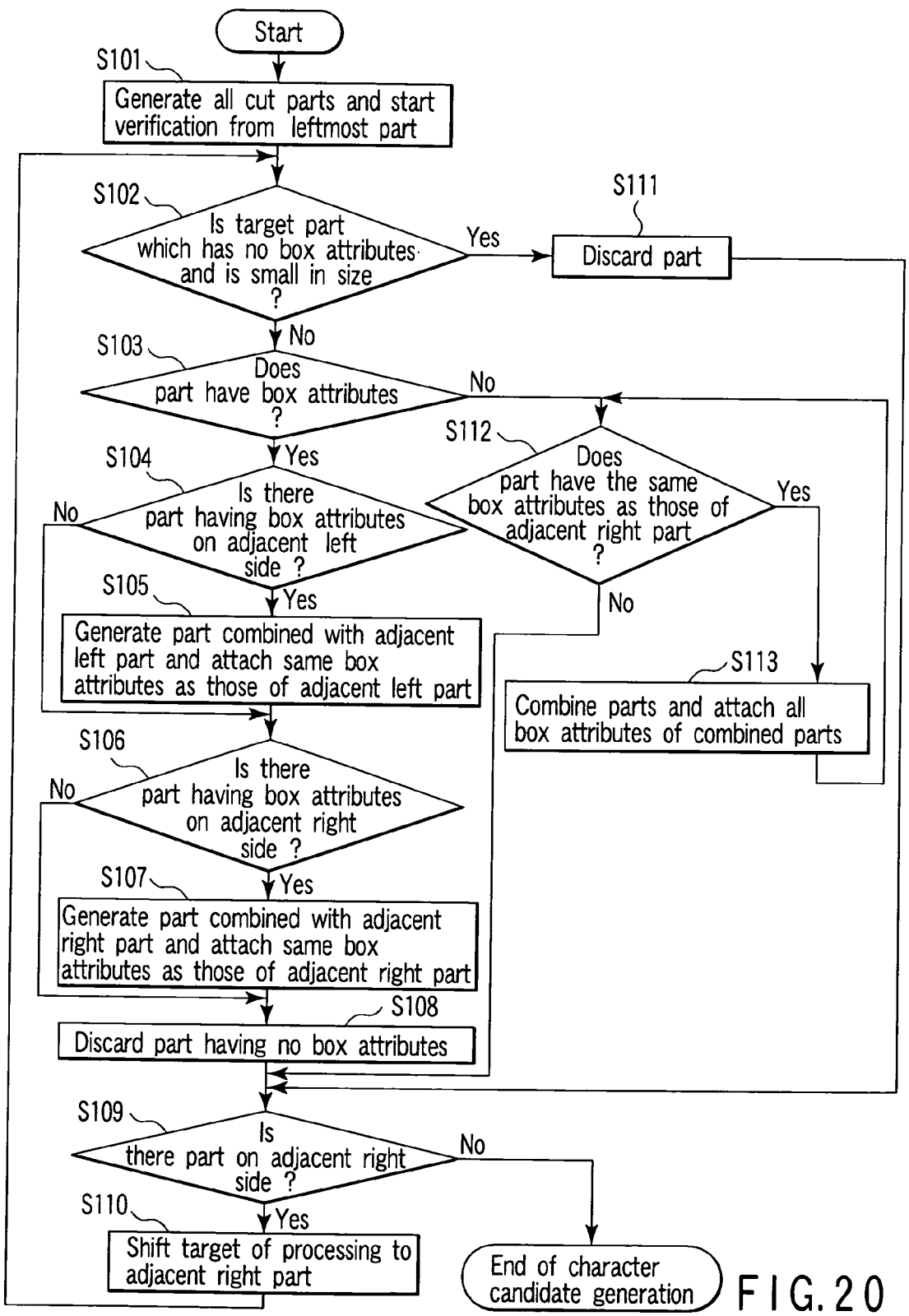
FIG. 20 is a flowchart showing an example of the operation in the use of other character candidate generation rules.

An example of the operation in the use of such character candidate generation rules will be described next with reference to FIG. 20.

After all character parts are generated by cutting and attributes are attached to them, verification is sequentially performed from the leftmost character part to determine whether to combine with a right adjacent character part (step S101).

First, it is determined that the target character part is a character part which has no box attributes and has a size less than a predetermined value (step S102). If the target character part meets these conditions, the character part is discarded (step S111). If the target character part does not meet the conditions, it is determined whether the target character part is a character part having no box attributes (step S103).

If the target character part is a character part having no box attributes, the following processing is performed. If there is a character part having box attributes on the adjacent left side, a character part is generated by combining the character part and the target part, and the same box attributes as those of the adjacent left character part are attached to the generated character part (steps S104 and S105). If there is a character part having box attributes on the adjacent right side, a character part is generated by combining the character part and the target part, and the same box attributes as those of the adjacent right character part are attached to the generated character part (steps S106 and S107). The part having no box attributes is discarded (step S108).

If the target character part is a character part having box attributes, it is determined whether the character part has the same box attributes as those of the adjacent right character part (step S112). If they have the same box attributes, the character parts are combined with each other, and the box attributes of the combined character parts are attached (step S113). This processing is repeated until the adjacent right character part has different box attributes.

Subsequently, if there is a character part on the adjacent right side of the target character part, the target of processing is shifted to the adjacent right character part, and verification is repeated (steps S109 and S110).

Each character part reconstructed in this manner is set as a character candidate, and the generation of all character candidates is complete. When the generation of all character candidates is complete, character recognition is performed for each character candidate.

As described above, according to this embodiment, a plurality of character cutting candidate points which are not limited by any character entry boxes are generated, and the character cutting candidate points are narrowed down on the basis of the information of the character entry boxes, thereby extracting and recognizing characters which are in contact with each other in a complicated manner, which cannot be recognized by any conventional character recognition techniques. According to the technique of this embodiment, since not many character candidates to be extracted are generated, the processing time can be shortened, and reading mistakes due to recognition of wrong character candidates can be reduced. In addition, after characters are separated into various character parts on the basis of character cutting candidate points, correct character candidates can be efficiently generated by adding attributes to the respective character parts on the basis of the information of character entry boxes and combining the character parts according to preset generation rules. Even if the shape of character entry boxes changes, optimal character candidates corresponding to the shape of each character entry box can be generated by changing the character candidate generation rules.

As has been described in detail above, according to the present invention, character extraction can be performed with high accuracy with respect to the character string written in a plurality of character entry boxes written on a sheet of paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A character recognition apparatus for generating each character candidate from a character string written in a plurality of character entry boxes written on a sheet of paper and performing character recognition, the apparatus comprising:
   an image acquiring unit which acquires an image containing the plurality of character entry boxes and the character string;
   a character extraction processing unit which detects each point at which a plurality of lines are in contact with each other or intersect in the character string contained in the image, determines a point at which the character string is to be cut or recombined on the basis of a placement relationship between the each point and a corresponding character entry box, and generates each character candidate constituting the character string by performing the cutting or recombination; and
   a character recognition unit which performs character recognition for each character candidate generated by the character extraction processing unit.

2. The apparatus according to claim 1, wherein if a distance between a detected point and a vertical line of a character entry box nearest to the point is not less than a predetermined value, the character extraction processing unit determines that cutting is not to be performed at a position of the point, and if the distance is less than the predetermined value, the character extraction processing unit determines that cutting is to be performed at the position of the point.

3. The apparatus according to claim 1, wherein if 1) central coordinates of a character part to be generated when cutting is performed at a position of a detected point fall within a predetermined range in a corresponding character entry box, 2) a size of the character part is not less than a predetermined value, and 3) a distance between the central coordinates of the character part and a vertical line of a character entry box nearest to a position of the central coordinates is not less than a predetermined value, the character extraction processing unit determines that cutting is performed at the position of the point.

4. The apparatus according to claim 1, wherein the character extraction processing unit comprises:
   an attribute attaching unit which attaches a box attribute for identifying a character entry box to which each character part belongs, the each character part being generated by cutting at a position of a point at which a plurality of lines of the character string are in contact with each other or intersect in the character string; and
   a character candidate generating unit which, when there are a plurality of character parts to which the same box attribute is attached by the attribute attaching unit, generates a new character part as one character candidate which is generated by recombining the plurality of character parts.

5. The apparatus according to claim 4, wherein if there is a character part to which no box attribute is adapted to be attached by the attribute attaching unit, the character candidate generating unit generates a new character part as one character candidate which is generated by combining the character part with an adjacent character part.

6. The apparatus according to claim 4, wherein if there is a character part to which no box attribute is adapted to be attached by the attribute attaching unit, the character candidate generating unit discards the character part when a longitudinal size of the character part is less than a predetermined value.

7. A character recognition method performed by a character recognition apparatus that generates each character candidate from a character string written in a plurality of character entry boxes written on a sheet of paper and performs character recognition, the method comprising:
   acquiring, via an image acquiring unit, an image containing the plurality of character entry boxes and the character string;
   performing, via a character extraction processing unit, character extraction processing of detecting each point at which a plurality of lines are in contact with each other or intersect in the character string contained in the image, determining a point at which the character string is to be cut or recombined on the basis of a placement relationship between the each point and a corresponding character entry box, and generating each character candidate constituting the character string by performing the cutting or recombination; and
   performing character recognition for each character candidate generated in the character extraction processing.

8. The method according to claim 7, wherein the character extraction processing includes, if a distance between a detected point and a vertical line of a character entry box nearest to the point is not less than a predetermined value, determining that cutting is not to be performed at a position of the point, and if the distance is less than the predetermined value, determining that cutting is to be performed at the position of the point.

9. The method according to claim 7, wherein the character extraction processing includes, if 1) central coordinates of a character part to be generated when cutting is performed at a position of a detected point fall within a predetermined range in a corresponding character entry box, 2) a size of the character part is not less than a predetermined value, and 3) a distance between the central coordinates of the character part and a vertical line of a character entry box nearest to a position of the central coordinates is not less than a predetermined value, determining that cutting is to be performed at the position of the point.

10. The method according to claim 7, wherein the character extraction processing includes:
   attaching a box attribute for identifying a character entry box to which each character part belongs, the each character part being generated by cutting at a position of a point at which a plurality of lines of the character string are in contact with each other or intersect in the character string; and performing character candidate generation of, if there are a plurality of character parts to which the same box attribute is attached in the attribute attaching) generating a new character part as one character candidate which is generated by recombining the plurality of character parts.

11. The method according to claim 10, wherein if there is a character part to which no box attribute is adapted to be attached in the attribute attaching, the character candidate generation includes generating a new character part as one character candidate which is generated by combining the character part with an adjacent character part.

12. The method according to claim 10, wherein the character candidate generation includes, if there is a character part to which no box attribute is adapted to be attached in the attribute attaching, discarding the character part when a longitudinal size of the character part is less than a predetermined value.

* * * * *